United States Patent Office 3,438,998
Patented Apr. 15, 1969

3,438,998
ANTIBIOTIC LAMBERTELLIN AND METHOD FOR PRODUCTION
Thomas Sproston, Jr., Burlington, Vt., assignor to Research Corporation, New York, N.Y., a nonprofit corporation of New York
No Drawing. Continuation-in-part of abandoned application Ser. No. 145,974, Oct. 18, 1961. This application Oct. 5, 1964, Ser. No. 401,667
Int. Cl. C07d 7/24; A61k 21/02
U.S. Cl. 260—343.2    9 Claims

ABSTRACT OF THE DISCLOSURE

Lambertellin, an antibiotic substance having the following structural formula

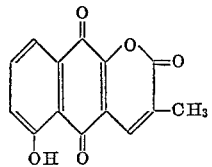

was isolated by the solvent extraction of ground dried cultures of *Lambertella hicoriae*.

---

This invention relates to a novel antibiotic substance and to method of producing and of using it.

The new antibiotic is obtained from sub-cultures of the fungus *Lambertella hicoriae* Whetzel (A Monograph of Lambertella, H. H. Whetzel, Lloydia, vol. 6, March 1943, pages 33–37) and has been given the name Lambertellin. The antibiotic may be extracted from the ground dried cultures with cold toluene or other liquid aromatic hydrocarbon. Evaporation of the solvent gives the crude Lambertellin as a reddish-orange powder. The crude Lambertellin thus obtained has useful antibiotic properties but further purification is desirable. A substantial degree of purification can be achieved by extracting the powder with warm ethanol which leaves a bright orange material, melting at about 244° C. Further impurities may be removed for analysis by passing a solution of the ethanol-washed Lambertellin in anhydrous acetone through a column of Magnesol (magnesium silicate absorbent). Highly colored impurities are retained on the Magnesol. After removal of the acetone by evaporation, washing with ice-cold ethanol and petroleum ether, and double recrystallization from chloroform the Lambertellin is obtained in the form of bright orange, rectangular platelets melting sharply at 248–250° C., the melting point remaining constant through further recrystallizations.

*Analysis.*—C=65.89%, H=3.48%, O=30.66%.

The maxima and minima of the ultraviolet extinction coefficients (E) of Lambertellin at $2.5 \times 10^{-5}$ g./l. in triple distilled absolute ethanol at 23° C. are given in the following table:

| $\lambda_{Max.}$, A. | $\lambda_{Min.}$, A. | E |
|---|---|---|
| 2,110 | | 1.9542 |
| | 2,750 | 1.6385 |
| 2,850 | | 1.7634 |
| 2,900 | | 1.7709 |
| | 3,300 | 0.5441 |
| 4,200 | | 1.3711 |

Addition of nickel nitrate to an ethanol solution of Lambertellin produces a deep purple color and reaction of Lambertellin with ethyl cyancoacetate and ammonia produces a blue-violet color. These color reactions together with the ultraviolet absorption spectrum indicate that Lambertellin is a hydroxynaphthoquinone or a hydroxyalkylnaphthoquinone having at least one hydroxyl in a peri position of the aromatic ring.

Analytical data, including mass spectra and nuclear magnetic resonances of the methyl ether of Lambertellin have established the following structural formula of Lambertellin:

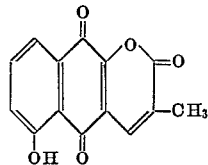

In the tables of infrared absorption bands in wave numbers given below major bands are underscored. S indicates a shoulder and W indicates a weak band.

INFRARED ABSORPTION BANDS

| Lambertellin | |
|---|---|
| 3450 | |
| 3080 | 1205W |
| <u>2930</u> | <u>1191</u> |
| <u>1740</u> | 1162 |
| 1668S | 1155S |
| <u>1652</u> | 1068–1064 |
| <u>1626</u> | <u>1035</u> |
| 1485S | 992 |
| 1455 | 927 |
| <u>1375</u> | 855 |
| 1320W | 836–834 |
| 1308W | |
| 1290–1283 | |

| Lambertellin Methyl Ether | | |
|---|---|---|
| 3045 | 1340 | 975 |
| <u>2900</u> | 1290–1282 | 933 |
| <u>1755</u> | <u>1243</u> | 890 |
| <u>1668</u> | <u>1195</u> | |
| 1640 | 1177 | |
| <u>1584</u> | 1090 | |
| <u>1472</u> | <u>1066</u> | |
| <u>1438</u> | <u>1030</u> | |
| <u>1385</u> | 1002 | |
| 1355 | | |

INFRARED ABSORPTION BANDS—Continued

| Lambertellin | Acetate |
|---|---|
| 3425 | |
| 3050 | 1290 |
| 2925 | |
| 1780W | 1245 |
| 1750 | 1200–1150 |
| | 1108 |
| | 1075 |
| 1680 | 1035 |
| 1670 | 1005 |
| 1640 | 990 |
| 1590 | 940 |
| 1465 | |
| 1445 | 925 |
| 1390 | 880 |
| 1370 | |
| 1352 | 855 |
| 1332 | 822 |
| 1320 | 797 |

Lambertellin is useful both as a bactericide and as a fungicide. In a standardized tube dilution test it completely inhibits the growth of *Staphylococcus aureus* at 1/ml. and *Streptococcus agalactiae* at 10/ml. Application of 80 parts per million of Lambertellin in water to tomato foliage gives 75% control of late blight as compared to zero for untreated plants. To determine the percent disease on the tomato foliage, lesion counts are made after a suitable period of incubation of the tomato plant following exposure to the late blight fungus. When applied to bean plants at a concentration of 16 parts per million of Lambertellin in water substantially complete (96%) control of bean rust (*Uromyces appendiculatus*) is provided as compared to zero for untreated plants.

Slide germination tests show that Lambertellin is 100% effective in suppressing spore germination of *Monilinia fructicola* at 0.5 part per million and of *Botrytis allii*, *Glomerella cingulata* and *Stemphylium sarcinaeforme* at 1.0 part per million, the highest dilutions thus far tested on these organisms.

The methyl ether and the monoacetate of Lambertellin are also fungicidal but in general show lower $ED_{50}$ values than Lambertellin.

Cultivation of *Lambertella hicoriae* for the production of the new antibiotic may be effected on sterile nutrient media containing sources of assimilable carbon and nitrogen and minerals. A potato-dextrose agar medium has been found to be suitable and incubation of the inoculated medium at 20°–25° C., followed by incubation at about 30°–32° C., has been found to be optimum for the development of the antibiotic on this medium.

A potato-dextrose agar medium of the composition

| | | |
|---|---|---|
| Potatoes | gm | 200 |
| Dextrose | gm | 20 |
| Bacto-agar | gm | 20 |
| Thiamine | microgm | 200 |
| Water | ml | 1000 | is poured into petri dishes, inoculated with *Lambertella hicoriae* and incubated in the dark at 20–25° C. for about 7 to 9 days and then at 30–32° C. for 3 to 5 days. The culture medium is then removed from the dishes, coarsely minced, dried at 65° C. in a thermostatically controlled oven fitted with a fan until brittle dry and then finely pulverized.

The pulverized dried culture is extracted by stirring with successive portions of cold toluene until no further color is extracted. The toluene is evaporated from the combined extracts in a flash evaporator on a water bath maintained at 60–65° C., leaving a reddish-orange residue of crude Lambertellin.

Five hundred milliliters of ethanol are added to the crude residue and the mixture heated to about 50° C. with stirring for about ten minutes. The mixture is then cooled, the undissolved material is separated from the red-brown ethanol solution by centrifuging, washed with a small volume of cold ethanol and petroleum ether (boiling range 30°–60° C.) and air dried, giving about 200–250 mg. of bright orange crystalline material melting at 248–250° C.

It has been found that higher and more consistent yields of Lambertellin may be obtained by cultivation in media containing sucrose in place of the dextrose. The following is a particularly suitable example of such media:

| | | |
|---|---|---|
| Difco bacto casamino acids | gms | 2 |
| Bacto-agar-agar | gms | 20 |
| Sucrose, USP | gms | 20 |
| Thiamine | micrograms | 200 |
| Minor element solution | ml | 2 |
| Water | ml | 1000 |

(Minor element solution—$Fe(NO_3)_3 \cdot 9H_2O$, 723.5 mg.; $ZnSO_4 \cdot 7H_2O$, 429.8 mg.; and $MgSO_4 \cdot 4H_2O$, 204.0 mg. per 100 ml. water.)

Lambertella is grown on this medium at 21° C. + or −1° from 12 to 14 days. The cultures are then transferred to a 7° C. incubator. Crystals are formed in 2 days.

The agar slabs are dried at 38° for 4 hours. These are ground to a fine powder and extracted by flooding with toluene. After filtering, toluene is removed in a flash evaporator. The solid is dissolved in absolute ethanol. After 2 recrystallizations from ethanol an ethanolic solution is passed through a cation exchange resin, such as Bio-Rad 50W x 8, 50–100 mesh. The eluate is concentrated and the Lambertellin crystallized several times from aqueous ethanol.

The methyl ether of Lambertellin is made as follows:

2 ml. of iodomethane and 200 mg. of silver oxide are added to 50 mg. of Lambertellin in 100 ml. of chloroform. The mixture is refluxed for twenty-four hours adding 0.2 ml. of iodomethane every four hours. After filtering through a fine glass sinter filter the reaction mixture is passed through a cation exchange column and the effluent is concentrated to dryness. The residue is recrystallized from chloroform and alcohol. M.P. 281–283° C.

*Analysis.*—C=66.34%, H=3.88%, O=29.78%, methoxyl=11.11%. Molecular weight=270.

The monoacetate of Lambertellin is made as follows:

30 mg. of Lambertellin is dissolved in 50 ml. of acetic anhydride with warming. Two drops of concentrated sulfuric acid are added and the mixture is allowed to stand for thirty minutes. The reaction mixture is then poured into 10 ml. of ice water, the precipitate is collected by filtration and recrystallized from ethanol. M.P. 219–221° C.

*Analysis.*—C=63.86%, H=4.35%, O=31.79%. Molecular weight=298.

I claim:

1. A method for the production of the antibiotic Lambertellin which comprises inoculating a sterile nutrient medium containing an assimilable carbon source, an assimilable nitrogen source and minerals with *Lambertella hicoriae* incubating the inoculated medium at a temperature in the neighborhood of 20–25° C., drying the incubated culture and extracting the dry culture with a liquid aromatic solvent.

2. A method for the production of the antibiotic Lambertellin which comprises inoculating a sterile nutrient medium containing an assimilable carbon source, an assimilable nitrogen source and minerals with *Lambertella hicoriae* incubating the inoculated medium at a temperature in the neighborhood of 20–25° C., drying the incubated culture and extracting the dry culture with toluene.

3. A method for the production of the antibiotic Lambertellin which comprises inoculating a sterile nutrient medium containing an assimilable carbon source including sucrose, an assimilable nitrogen source and minerals with *Lambertella hicoriae* incubating the inoculated medium at a temperature in the neighborhood of 20–25° C., drying the incubated culture and extracting the dry culture with toluene.

4. A method for the production of the antibiotic Lambertellin which comprises extracting a dry culture of *Lambertella hicoriae* with a liquid aromatic solvent.

5. A method for the production of the antibiotic Lambertellin which comprises extracting a dry culture of *Lambertella hicoriae* with toluene.

6. A method for the production of the antibiotic Lambertellin which comprises extracting a dry culture of *Lambertella hicoriae* with a liquid aromatic solvent, evaporating the solvent from the extract, extracting the residue with ethanol, and drying the extracted residue.

7. The antibiotic Lambertellin having the structural formula

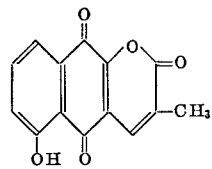

8. A method of treating plants infested with phytopathic fungi which comprises applying to the plants a dispersion of the antibiotic defined in claim 7 in a non-phytotoxic medium.

9. A method of treating plants infested with phytopathic fungi which comprises applying to the plants an aqueous dispersion of the antibiotic defined in claim 7.

References Cited

UNITED STATES PATENTS 2,633,445   3/1953   Marsh et al. _____ 167—65

ALBERT T. MEYERS, *Primary Examiner.*

O. M. STEPHENS, *Assistant Examiner.*

U.S. Cl. X.R.

424—122